Oct. 27, 1942.   C. A. F. MEYER   2,300,057
HOSE REINFORCEMENT MEANS
Filed March 29, 1940   2 Sheets-Sheet 1
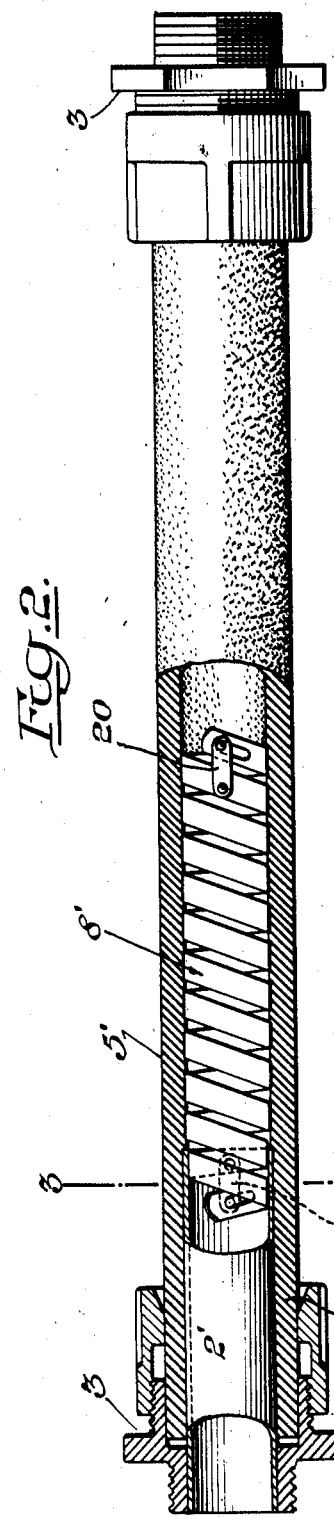
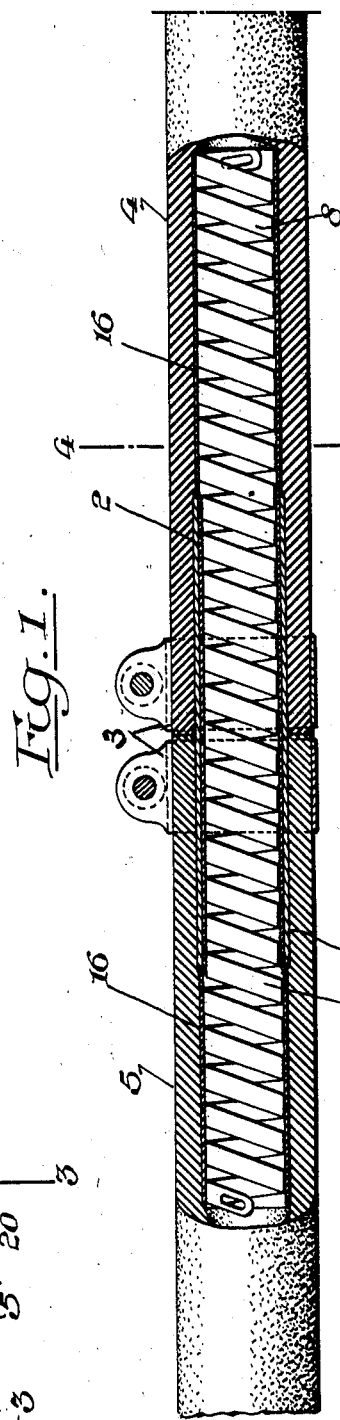
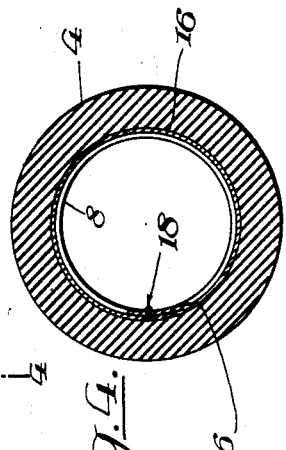
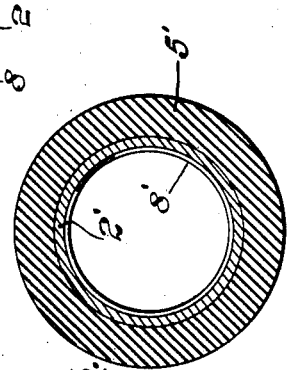
INVENTOR.
Charles A. F. Meyer
BY
ATTORNEY.

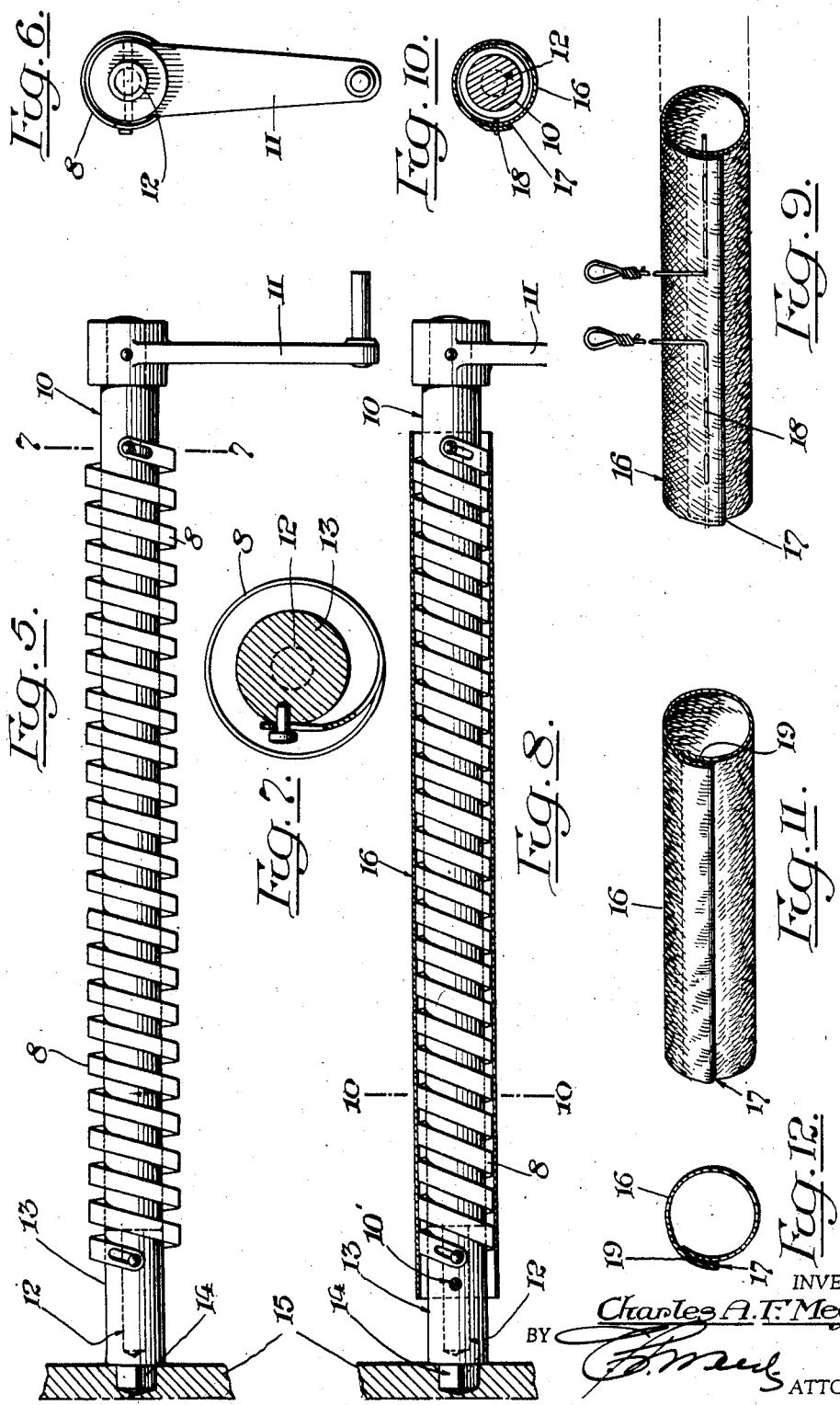

Patented Oct. 27, 1942

2,300,057

UNITED STATES PATENT OFFICE 2,300,057

HOSE REINFORCEMENT MEANS

Charles A. F. Meyer, Ridgewood, N. Y.

Application March 29, 1940, Serial No. 326,572

12 Claims. (Cl. 285—75)

This invention relates to reinforcing means for flexible conduits or hose such as that used for conveying oil, gasoline and similar products, and to the method of applying the same, the object of the invention being to provide improved means which will prevent kinking, buckling, cutting or rupturing of the hose, or the collapse of the inner tube thereof at those points where this frequently occurs, and is particularly adapted for use at the coupled ends of two lengths of hose although, in one form thereof, it may be used at the nozzle or free end of the hose.

As is well known in the use of hose of the type referred to, the greatest damage usually occurs adjacent the coupled or fitted ends of the hose or at the nozzle or free end because the inner ends of the metal couplings or fittings cut, tear or wear the hose in use when the hose is subjected to sharp bends and kinks where it extends beyond these ends of the metal couplings. Furthermore, practically all hose made of rubber or artificial rubber has a tendency to absorb the oil, grease or gasoline passing therethrough, causing the swelling of the hose, increasing its thickness and so closing or contracting the diameter thereof and when this occurs adjacent the free ends of the metal couplings or fittings, the ends of these metal parts not infrequently cut and damage the inner wall or tube of the hose, this being materially assisted by the kinking or bending of the hose at these points, resulting in the cutting or rupturing of the hose and considerably shortening the life thereof.

Therefore, the primary object of this improvement is the provision of a simple, inexpensive and practical means that will eliminate the foregoing disadvantages, thus prolonging the useful life of the hose and which means can be applied in an expeditious and inexpensive manner.

In the drawings accompanying and forming a part of this specification, Fig. 1 illustrates partly in section the present improvement applied to the coupled ends of two lengths of hose.

Fig. 2 is a similar view illustrating a different form of the improvement applied to one end of a length of hose.

Fig. 3 is a cross section taken on line 3—3 of Fig. 2.

Fig. 4 is a cross section taken on line 4—4 of Fig. 1.

Fig. 5 illustrates one form of means which may be used for coiling the spring prior to its application to the hose.

Fig. 6 is a right hand end view thereof.

Fig. 7 is a cross-sectional view taken on line 7—7 of Fig. 5.

Fig. 8 is a partly sectional view illustrating the spring when it is wound, with means such as a textile or canvas cover for maintaining it in that condition prior to its insertion in the hose.

Fig. 9 illustrates one form of canvas cover that may be used.

Fig. 10 is a sectional view taken on line 10—10 of Fig. 8.

Fig. 11 is a view of another form of canvas cover that may be used, and

Fig. 12 is a sectional view thereof.

Similar characters of reference indicate corresponding parts in the several views.

Before explaining in detail the present improvement and its operation, I desire it understood that the invention is not limited to the details of construction and arrangement of parts illustrated in the accompanying drawings since the invention is capable of other embodiments, and that the phraseology employed is for the purpose of description and not of limitation.

One of the serious difficulties with hose used for the conduct of oil, gasoline and similar fluids is that, in use, it frequently bends, kinks or swells. Consequently, at those points where it extends beyond the end of the coupling or the metal fitting on the exterior thereof, it is cut or ruptured by the free edges of these metal parts. Not only this, but the hose has a tendency to absorb the product which passes therethrough causing it to swell, which swelling not only decreases the inside diameter of the hose but causes it to flex or swell over the edge of the metal parts and thus be cut or ruptured and while the present improvement may be used throughout the entire length of the hose, it is particularly adapted for use at the coupled ends of adjacent lengths thereof.

In carrying out this invention, I provide a rigid, such as a metal, tube or sleeve 2 of sufficient length to project interiorly of both adjacent lengths or sections of hose and extend sufficiently beyond each end of the hose 3 or metal fittings applied to the hose.

In Fig. 1 of the drawings I have shown the adjacent ends of two lengths of hose 4 and 5 clamped to this tube by the usual metal fittings such as clamps or rings 3. Located within the tube 2 and projecting a considerable distance beyond both ends thereof is a coiled spring 8, preferably flat and which, by reason of its expansion beyond the ends of the tube 2, contacts and protects the inner wall of the hose from injury by the ends of this tube 2.

The flat construction of this spring 8 when its coils expand into engagement with the inner wall of the hose provides an extensive bearing surface along the hose wall, it being held in position by its expansion since, before insertion into the hose, it is coiled to have a less diameter than when expanded. When fully expanded, it has a diameter somewhat greater than the inner diameter of the hose and thus contacts the inner wall of the hose with the result that cutting or rupture of the hose at the ends of the tube 2 is prevented as well as the swelling of the interior of the hose which would materially decrease its diameter and also the collapse of the hose and any buckling or kinking thereof since the hose is protected at the coupling and for a considerable distance therebeyond.

For the purpose of inserting this spring within the hose, any suitable means may be used, one form of which is shown in Fig. 5. This means comprises a mandrel such as a round rod 10 to which one end of the spring 8 is secured temporarily and to which rod 10 a suitable handle or crank 11 is applied. This rod is provided at its other end with a fixed projecting portion 12 of smaller diameter extending into and rotatable in a short member 13 having a diameter substantially the same as the rod 10 and to which short end, the opposite end of the spring 8 is likewise temporarily attached. The short member 13 may be provided with a squared end 14 for insertion into a similarly formed socket of a fixed member 15, thereby to facilitate winding of the spring.

Thus, by turning the handle, the spring will be wound by the mandrel to a diameter substantially conforming to the outer diameter of the rod 10. Thereupon, to maintain the spring in this contracted wound condition and permit the removal of the handle 11, the parts 10 and 12 may be locked together by any simple means as by inserting a pin 10' through meeting holes in such parts (see Fig. 8). Then, over this tightly wound spring 8 is slipped a suitable retaining means in the form of a tubular flexible sleeve 16, preferably of canvas and having the same length as the spring. Or, if preferred, a separate cover may be slipped over each end of the spring.

This tubular cover or retaining means having a diameter corresponding to the inner diameter of the hose may be formed on a loom or braiding machine and either before or after it is slipped over the spring, is provided with a fold or pleat 17 at one or more points lengthwise thereof to reduce its diameter to that of the wound spring. These folds or pleats may be suitably stitched or connected by wire threads 18, as in Fig. 9, or glued as at 19 in Fig. 11. When wire threads are used, they may be suitably withdrawn at the proper time at the meeting ends of the hose sections before the clamping means are applied.

When stitched, the expansion of the spring will, in a short time, break the threads and when glue is used, the glue will be dissolved by the passage of the liquids therethrough.

In any event, this will permit the canvas cover and spring to expand to a greater diameter beyond the ends of the tube 2 and contact the inner wall of the hose, maintaining it against interior collapse or swelling to any appreciable extent, thus preventing cutting, breaking or rupture of the hose.

After the canvas cover is applied to the spring and prior to opening the seam thereof, the tube 2 may be slipped thereon, the winding means having been first withdrawn, and the companion end of the hose then inserted over the opposite end of the contracted spring in its canvas cover and the projecting end of the metal tube 2, whereupon the hose sections are clamped thereto and for which purpose the tube may be serrated so as to keep the hose from slipping off thereof.

For the purpose of withdrawing the winding means, the spring is provided at one end with a slot for the purpose of receiving a suitable form of temporary anchoring means carried by the mandrel which will permit the spring, as the winding means is slightly turned or shifted, to release itself from that winding means. The opposite end of the spring may be secured to the winding means by suitable fastening means such as a screw or staple, one leg of which is longer than the other and either of which may be easily removed at the end of the canvas cover.

Therefore, in practice, in view of the use of the canvas cover for holding the spring contracted and since the metal tube over the canvas cover has a diameter substantially corresponding to the bore of the hose, it is possible to remove the winding means after the unit is completed and then insert one end of the unit into one section of the hose and apply the opposite section of the hose over the other end of the unit.

In Fig. 2, which illustrates one form of the improvement applied to one section of the base such as the nozzle or free end of the hose, the metal tube 2' is shown rigidly secured within the metal fitting such as the male member of the coupling or fitting 3 so as to project a substantial distance within the hose 5', the spring 8 being coiled sufficiently tight so that one end thereof can be inserted into the tube 2', it being held therein by friction, while the rest of the spring will extend within the hose to protect the same in the manner hereinbefore described.

In this form of the improvement, the free ends of the spring have a pair of its coils connected by a short member 20 so as to prevent the outer end of the coil from slipping away from its adjacent coil. This spring may be wound similarly to that hereinbefore described in any suitable way. However, the winding means may be readily disconnected after insertion into the end of the hose through the tube 2' and for this purpose, the free end of the spring may be secured by some simple means which will permit the spring to release itself therefrom.

In the form of spring shown in Fig. 1, the diameter is governed by the setting of the spring. In other words, the expansion of the spring is limited but, in the form shown in Fig. 2, the spring comprises a flat metal tape similar to that used for metal measuring tapes so that it has greater resiliency and expansion than the spring of Fig. 1. The coils thereof are also somewhat wider than those shown in Fig. 1 and this tape can expand to fit any diameter of hose to which it may be applied whereas, in the form shown in Fig. 1, different diameters of set springs must be used for different diameters of hose, and when applied in position in the hose, the recoil of the spring 8' into engagement with the hose holds it in this position against movement.

Thus, by using the spring of the form shown in Fig. 2, the pitch of that spring may be changed as desired, that is to say, shortened or lengthened, since the spring may be coiled for either a 12" or shorter length or elongated for a 3' or longer length if desired as the coils are not set and, by reason of its construction and resiliency, it will spring to fit any diameter of hose to which it may be applied whereas, as hereinbefore stated, in the form shown in Fig. 1, the diameter of the spring is governed by the setting of the spring and will not expand beyond a predetermined point.

It is to be understood that, by describing herein in detail any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. The combination with a pair of adjacent hose sections, of means for reinforcing the same and preventing kinking, bending and swelling thereof and comprising a coiled spring expansible into contact with the inner walls of the hose and having its opposite coiled ends projecting into adjacent ends of the hose and having a normal diameter substantially not less than the inner diameter of the hose and in which a rigid sleeve shorter than the spring is located between the ends thereof and a releasable expansible means covers the spring beyond the ends of the rigid sleeve and is adapted to permit the spring to expand into engagement with the inner walls of the hose, said expansible means comprising a folded or pleated cover.

2. The combination with a pair of adjacent hose sections, of means for reinforcing the same and preventing kinking, bending and swelling thereof and comprising a coiled spring expansible into contact with the inner walls of the hose and having its opposite coiled ends projecting into adjacent ends of the hose and having a normal diameter substantially not less than the inner diameter of the hose and in which a rigid sleeve shorter than the spring is located between the ends thereof and a releasable expansible means covers the spring beyond the ends of the rigid sleeve and is adapted to permit the spring to expand into engagement with the inner walls of the hose, said expansible means comprising a stitched, seamed flexible cover.

3. The combination with a pair of adjacent hose sections, of means for reinforcing the same and preventing kinking, bending and swelling thereof and comprising a coiled spring expansible into contact with the inner walls of the hose and having its opposite coiled ends projecting into adjacent ends of the hose and having a normal diameter substantially not less than the inner diameter of the hose and in which a rigid sleeve shorter than the spring is located between the ends thereof and a releasable expansible means covers the spring beyond the ends of the rigid sleeve and is adapted to permit the spring to expand into engagement with the inner walls of the hose, said expansible means comprising a wire-stitched seamed canvas cover.

4. The combination with a pair of adjacent hose sections, of means for reinforcing the same and preventing kinking, bending and swelling thereof and comprising a coiled spring expansible into contact with the inner walls of the hose and having its opposite coiled ends projecting into adjacent ends of the hose and having a normal diameter substantially not less than the inner diameter of the hose and in which a rigid sleeve shorter than the spring is located between the ends thereof and a releasable expansible means covers the spring beyond the ends of the rigid sleeve and is adapted to permit the spring to expand into engagement with the inner walls of the hose, said expansible means comprising a glued-seamed flexible cover.

5. A reinforcement means for a hose adapted for insertion into one or more sections of a hose and comprising a coiled spring, a flexible folded or pleated expansible cover therefor, and a substantially rigid tube over a part of said cover.

6. A reinforcement for a hose comprising a wound coiled spring of less than its normal diameter and a flexible, expansible or dilatable folded or pleated retaining means thereon.

7. The hose reinforcement of claim 6 having a rigid tube on one end of the spring.

8. The combination with a hose, of means for reinforcing the same and preventing kinking, bending and swelling thereof and comprising a coiled spring expansible into contact with the inner wall of the hose, a rigid sleeve covering a part of the spring and an expansible folded or pleated cover for the spring and having a diameter substantially corresponding with the inner diameter of the hose and initially having a diameter less than its expanded diameter and serving to hold the spring in a contracted position and when expanded serving as a reinforcement of the hose.

9. The combination with a pair of adjacent hose sections, of a reinforcement therefor comprising a coiled flat spring extending into the adjacent ends of the hose sections for a predetermined distance, a metal sleeve centrally of said spring and contracting the same adjacent to its center portion to less than the diameter of the hose whereby the projecting ends of the spring will expand into engagement with the inner wall of the hose sections, and a folded or pleated cover means initially holding the spring in contracted relation in the hose sections and capable of expansion after the insertion of the spring into the hose sections.

10. The structure of claim 9 in which the folded or pleated cover means comprises a textile tube.

11. A hose having reinforcing means therein comprising a coiled spring and a folded or pleated releasable expansible cover means for said spring and adapted to permit the reinforcing means to expand into engagement with the inner wall of the hose.

12. A hose having reinforcing means therein comprising a coiled spring, a rigid sleeve thereon shorter than the spring, and a folded or pleated releasable expansible cover means for said spring and adapted to permit the spring and its cover to expand into engagement with the inner wall of the hose.

CHARLES A. F. MEYER.